E. W. MOON.
NUT LOCK.
APPLICATION FILED FEB. 23, 1916.

1,249,802.

Patented Dec. 11, 1917.

INVENTOR.
EARL W. MOON.
BY
A. S. McLundie.
ATTORNEY.

UNITED STATES PATENT OFFICE.

EARL W. MOON, OF HOLLAND, GEORGIA.

NUT-LOCK.

1,249,802.  Specification of Letters Patent.  Patented Dec. 11, 1917.

Application filed February 23, 1916. Serial No. 79,978.

*To all whom it may concern:*

Be it known that I, EARL W. MOON, a citizen of the United States, residing at Holland, in the county of Chattooga and State of Georgia, have invented certain new and useful Improvements in Nut-Locks, of which the following is a specification.

My invention relates to an improvement in nut locking devices of that class wherein a distorted key holding means is employed to prevent a nut from backing off from the bolt with which the nut is used.

The primary object of the present invention resides in providing an effective nut locking device of the above mentioned class, wherein a key is employed which is retained against longitudinal movement relative to the bolt by means engaging a recess in the latter, and also the key is retained, by the nut, against bodily displacement and is distorted to prevent the nut from backing off from the bolt.

With the above and other objects in view, I will now proceed to describe specific embodiments of the present invention which I have shown in the accompanying drawing, wherein.

Figure 1:
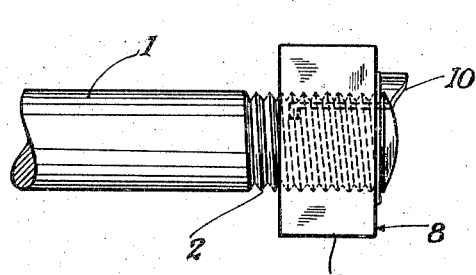
Figure 1 is a side elevation of the device with the nut locked by twisting the key means.

In detail:

The device, as shown, comprises a bolt 1 having a threaded length 2 provided with a longitudinally extending spline or key-way 3 which terminates at one end in an inwardly directed recess 4. The spline or key-way 3 is deep enough to permit a key 5 to be placed therein without projecting above the threads of the length 2.

The key 5 consists of a straight portion 6 of substantially greater length than the spline or key-way 3 and having at one end a right angular extension 7. The key 5 is positioned in the spline or key-way 3 with the right angle extension 7 seating in the inwardly directed recess 4. A nut 8 having faces 9 is then screwed onto the bolt 1.

Figure 2:
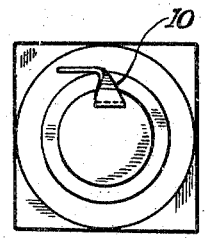
Fig. 2 is an end elevation of the same.
Figure 4:
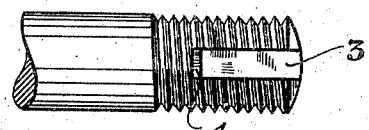
Fig. 4 is a side elevation of the bolt, without the nut and key, but showing the key-way.
Figure 3:
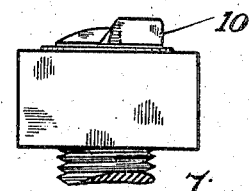
Fig. 3 is a side elevation of the same.
Figure 5:
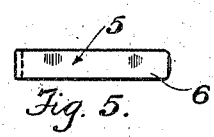
Fig. 5 is a rear view, in plan, of the key.
Figure 6:
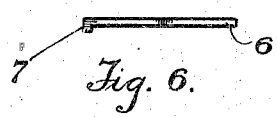
Fig. 6 is a side elevation of the key.

After positioning the nut at the proper point on the threaded length 2 it will be found that the straight length 6 of the key 5 projects considerably beyond the nut; and it will also be found that the nut is then prevented from backing off the bolt if the upper portion of the key 5 is bent or twisted as shown in Figs. 1 to 3 inclusive at 10 which thus prevents any rotative movement whatsoever of the nut due to the fact that the key 5, by reason of the engagement of the extension 7 in the recess 4, also precludes the said key from moving longitudinally off the bolt 1. Furthermore, the nut 8 prevents the key 5 from being bodily displaced.

Figure 7:
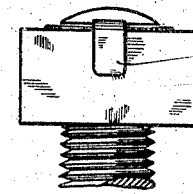
Fig. 7 is a view, in side elevation, similar to Fig. 1 but showing the key distorted to lock the nut by bending the key downwardly into engagement with one face thereof.

Other ways of bending the key and distorting it may be resorted to in order to effect the locking, such as for instance the manner shown in Fig. 7, wherein the key instead of being twisted is bent over one face 9 of the nut 8 as shown at 11.

While, in the foregoing description and in the drawings, I have set forth a specific embodiment of the present invention, it is nevertheless to be understood that, in practise, I may resort to such modifications as fall within the scope of the invention as defined in the appended claim.

I claim:

The combination with a screw-threaded bolt having a groove extending longitudinally of its threaded portion and a recess at the inner end of said groove, of a nut designed to engage said screw threads, and a locking member formed of flexible metal adapted to engage said groove and consisting of a strip having its inner end bent at right angles to its main portion to engage said recess and having its outer portion bent diagonally whereby one edge of said strip engages the outer face of said nut.

In testimony whereof I have hereunto set my hand in the presence of two subscribing witnesses.

EARL W. MOON.

Witnesses:
G. S. HOLLAND,
A. M. STRAUS.